(12) United States Patent
Sheaffer

(10) Patent No.: US 7,260,592 B2
(45) Date of Patent: Aug. 21, 2007

(54) ADDRESSING MODE AND/OR INSTRUCTION FOR PROVIDING SINE AND COSINE VALUE PAIRS

(75) Inventor: Gad Sheaffer, Haifa (IL)

(73) Assignee: Intel Corporation, Santa Clara, CA (US)

(*) Notice: Subject to any disclaimer, the term of this patent is extended or adjusted under 35 U.S.C. 154(b) by 966 days.

(21) Appl. No.: 10/107,262

(22) Filed: Mar. 28, 2002

(65) Prior Publication Data
US 2003/0188136 A1    Oct. 2, 2003

(51) Int. Cl.
*G06F 1/02*    (2006.01)
(52) U.S. Cl. .................................................. 708/276
(58) Field of Classification Search .................. 708/276
See application file for complete search history.

(56) References Cited

U.S. PATENT DOCUMENTS 5,467,294 A * 11/1995 Hu et al. ..................... 708/276
5,737,253 A * 4/1998 Madisetti et al. ........... 708/276
5,774,082 A * 6/1998 Chu et al. .................... 341/117
RE36,388 E * 11/1999 Fox et al. .................... 708/276
6,330,578 B1 * 12/2001 Savin et al. ................. 708/270

* cited by examiner

*Primary Examiner*—D. H. Malzahn
(74) *Attorney, Agent, or Firm*—Kenyon & Kenyon LLP

(57) ABSTRACT

The present invention relates to a method and system for providing sine and cosine value pairs in a processor. The method includes decoding a sine and cosine instruction having a predetermined source angle and generating an index value for a sine cosine table (SCT) using a sine cosine control register (SCCR). The method also includes generating a plurality of quadrant bits using the SCCR, reading a sine and a cosine value pair from the SCT using the index value, and adjusting a sign of each value of the sine and the cosine value pair using the plurality of quadrant bits, if necessary. The method further includes incrementing the SCCR, if the SCCR is to be incremented, executing the sine and cosine instruction using the sine and cosine value pair, and outputting at least one result.

30 Claims, 5 Drawing Sheets

ADDRESSING MODE AND/OR INSTRUCTION FOR PROVIDING SINE AND COSINE VALUE PAIRS

FIELD OF THE INVENTION

The present invention relates to processor architectures and instruction sets, and in particular, to processor architectures with instruction sets which provide new addressing modes and/or instructions for providing sine & cosine value pairs.

BACKGROUND

Sine and cosine values are regularly used in, for example, signal processing applications. Typically, computations use a sine/cosine pair of values together, for example in digital down conversion or in rotational transformations of coordinates. Historically, sine and cosine values have been produced by using long latency instructions that either calculate or lookup the sine and cosine values. However, before the values may be looked up, the values must either first be packed in sine and cosine pairs in a lookup table or in two separate tables that are looked up in parallel. Unfortunately, producing both the sine and cosine value pairs using the above long latency instructions can consume tens to hundreds of cycles as well as use lookup tables that use a large amount of memory.

Mechanisms that can efficiently and quickly provide sine and cosine value pairs for instruction processing would be beneficial.

DETAILED DESCRIPTION

In accordance with an embodiment of the present invention, an addressing mode may be implemented to provide sine and cosine value pairs to instructions. Similarly, in accordance with another embodiment of the present invention, an instruction may be implemented to provide sine and cosine value pairs that may be used by later instructions.

Figure 1:
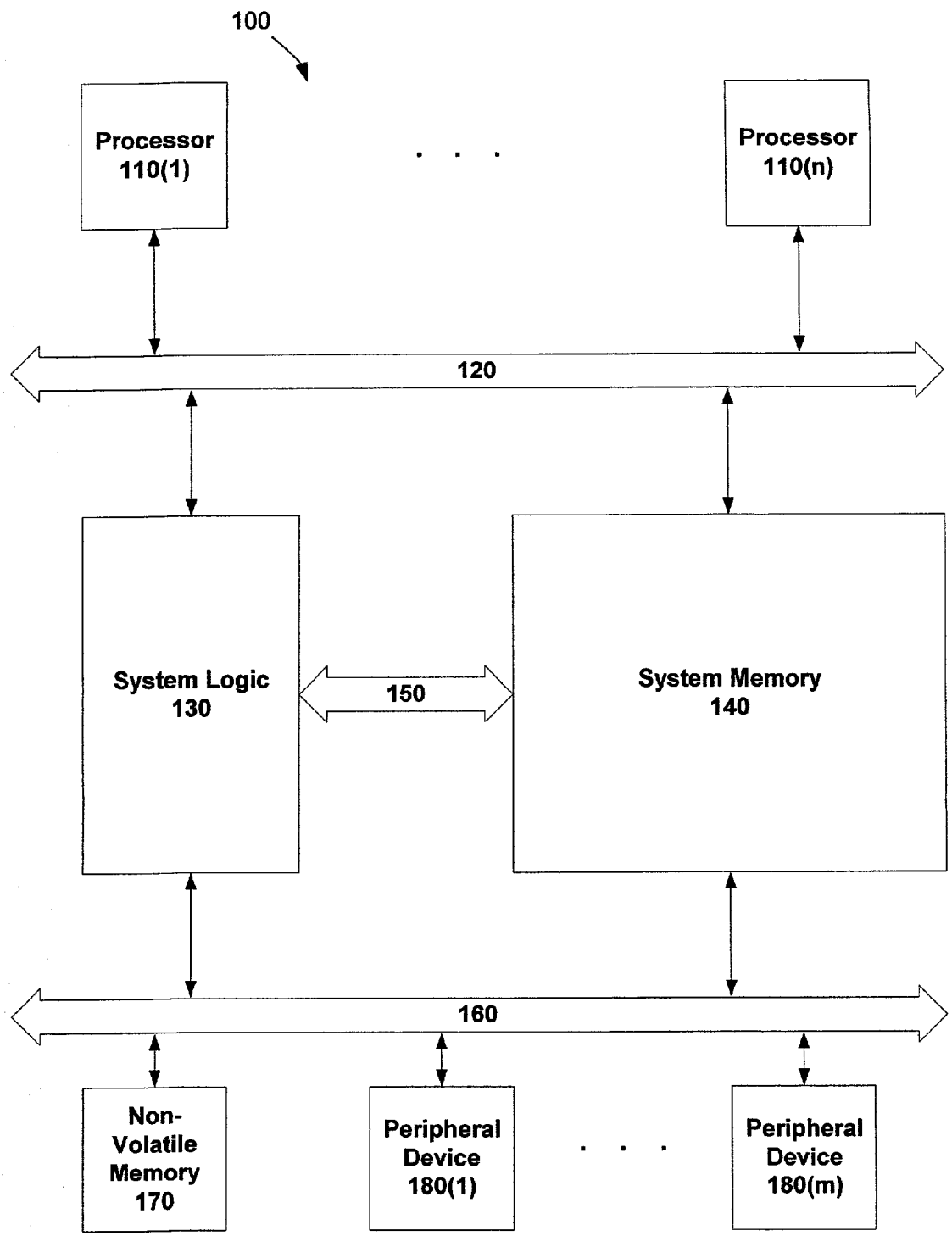
FIG. 1 is a block diagram of a computer system that includes an architectural state including one or more processors, registers and memory, in accordance with an embodiment of the present invention.

FIG. 1 is a block diagram of a computer system, which includes an architectural state, including one or more processors, registers and memory, in accordance with an embodiment of the present invention. In FIG. 1, a computer system 100 may include one or more processors 110(1)-110(n) coupled to a processor bus 120, which may be coupled to a system logic 130. Each of the one or more processors 110(1)-110(n) may be N-bit processors and may include one or more N-bit registers (not shown). System logic 130 may be coupled to a system memory 140 through a bus 150 and coupled to a non-volatile memory 170 and one or more peripheral devices 180(1)-180(m) through a peripheral bus 160. Peripheral bus 160 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 170 may be a static memory device such as a read only memory (ROM) or a flash memory. Peripheral devices 180(1)-180(m) may include, for example, a keyboard; a mouse or other pointing devices; mass storage devices such as hard disk drives, compact disc (CD) drives, optical disks, and digital video disc (DVD) drives; displays and the like.

In accordance with an embodiment of the present invention, instructions that provide sine and cosine value pairs may be implemented as an addressing mode and/or as an instruction to provide the sine and cosine pairs from a lookup table, for example, a Sine Cosine Table (SCT) and associated circuitry. By exploiting the symmetry properties of sine and cosine values, the SCT may need only 25% of the memory size normally needed to implement the table. Specifically in this embodiment, the SCT need only contain sine values for angles from 0 to 90 degrees, which are in quadrant one of a 360 degree circle, to be able to generate the sine and cosine value pairs for angles from 0 degrees to 360 degrees. This is true since the cosine of any angle can be calculated by determining the sine of the complementary angle, for example, in quadrant one, for an angle $\theta=30$ degrees, the complementary angle may be determined using $90-\theta$. Therefore, the complementary angle for the angle $\theta=30$ is 90−30 or 60 degrees. In addition, the sine and cosine values for angles over 90 degrees, that is angles in quadrants two ($90<\theta\leq180$), three ($180<\theta\leq270$) and four ($270<\theta\leq360$), may be similarly calculated. Specifically, the sine and cosine value pair can be calculated by transforming all angles to the first quadrant (that is, 0 to 90 degrees, which is 0 to $\Pi/2$ radians), calculating the appropriate sine and cosine value pair for the transformed angle, and adjusting the signs of the sine and cosine value pair based on in which quadrant the original angle was located. For example, for the 30 degree angle above, since 60 degrees is the complementary angle, the cosine of 30 degrees is equal to the sine of 60 degrees, which equals 0.866.

In general, by arranging the SCT data entries symmetrically in the SCT, the addressing of the angle and complementary angle values may be significantly simplified. For example, in the SCT each data entry located at a first offset from the base address (SCT[index]) of the first entry in the SCT may have a complementary angle entry at a second entry defined by one less than the total number of entries minus the first offset (SCT[$2^M-1$−index]). Similarly, for an angle of 120 degrees, which is in quadrant 4, the transformed angle would be equal to 30 degrees and, as above, the cosine of 30 degrees is equal to the sine of 60 degrees or 0.866, and the sign of the cosine value may be adjusted to −0.866 based on the 120 degree angle being located in quadrant 4. Since the sign of the sine value for the 120 degree angle is positive, it does not need to be adjusted.

For example, in accordance with an embodiment of the present invention, in a highly simplified system, only eight (8) sine value entries may be stored in the SCT for 0, 15, 30, 40, 50, 60, 75 and 90 degrees. Specifically, for an angle of 40 degrees, the sine value may be read directly from the SCT by referencing the entry for 40 degrees and the cosine value may be read directly from the SCT by referencing the sine value of the complementary angle to 40 degrees, namely the sine value of 50 degrees. Similarly, it should be understood that the above exemplary embodiments are merely illustrative of the concept of the present invention, and that the instruction, the addressing mode instruction and the SCT may be implemented using 8-bit, 16-bit, 32-bit and/or larger data types.

In accordance with an embodiment of the present invention, the SCT can be useful in numerous applications, for example, to provide "twiddle factors" for Fast Fourier Transform (FFT) butterfly computations and/or rotational geometry transformations. The SCT may be implemented as a lookup table having $2^M$ N-bit entries, which contain the values that may be used to determine the pair of sine and cosine values that may be output from the SCT. For example, in accordance with an embodiment of the present invention, if M=10 and N=16, the SCT would have $2^{10}$=1024 16-bit entries. Likewise, the output of the SCT would be a pair of 16-bit sine and cosine values where, in general, the sine value may occupy the most significant bits of the pair. However, the sine value may also occupy the least significant bits of the pair, depending on the needs of the instruction to which the sine and cosine value pair is being provided.

The sine and cosine value pair instruction may use one or more Sine Cosine Control Registers (SCCR), for example, SCCR0 and SCCR1. Similar to the sine and cosine and the addressing mode instructions and the SCT, each SCCR may be implemented using 8-bit, 16-bit, 32- and/or more-bits. The exact size of the SCCR, generally, depends on the size of the SCT. Each SCCR may have a number of fields, which, may be defined, for example, as:

SCCRi.phase:=A field representing the phase that is used to index the SCT and may be incremented more than once per cycle,
SCCRi.stride:=The value used to increment the phase,
SCCRi.scale:=The number of LSB bits ignored when indexing the SCT, where i≧0, and i identifies which of the SCCRs is being used. It should be understood that the above-defined SCCR fields are merely illustrative of the concept of the present invention and may vary with the precision of the data. For example, in accordance with an embodiment of the present invention, the SCCR may be implemented as a 32-bit register, the phase may be 20 bits, the stride may be 8 bits and the scale may be 3 bits; and the SCT may be implemented as a 16-bit lookup table.

Figure 2:
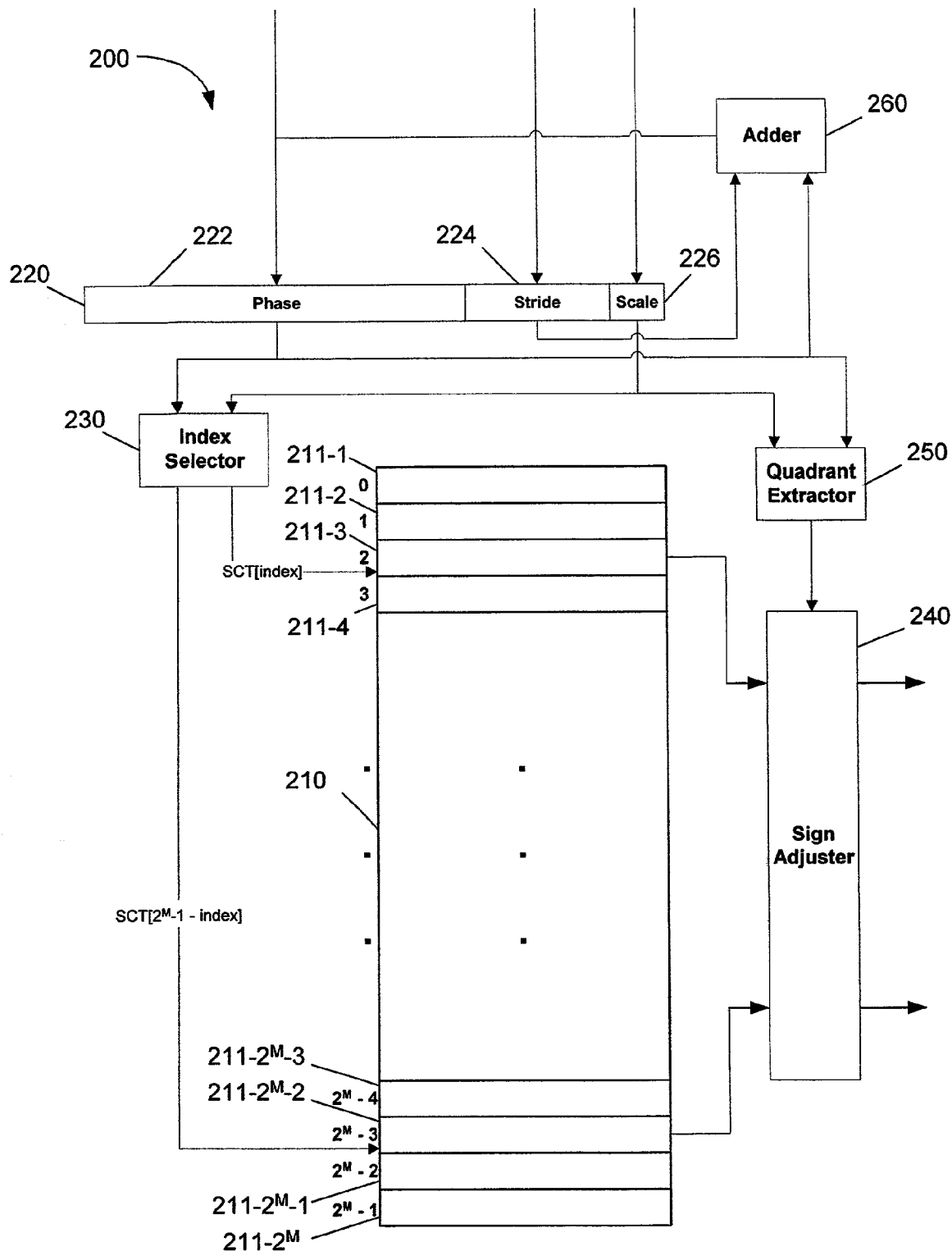
FIG. 2 is a block diagram of a sine and cosine table for providing sine and cosine value pairs to instruction in a processor, in accordance with an embodiment of the present invention.

FIG. 2 is a block diagram of a SCT 200 for providing sine and cosine value pairs for instruction processing in a processor, in accordance with an embodiment of the present invention. In FIG. 2, SCT 200 may include a sine cosine array 210 having a plurality of entries 211-1 through 211-$2^M$. A SCCR 220 may include a phase portion 222, a stride portion 224 and a scale portion 226. Phase portion 222 and scale portion 226 may be coupled to an index selector 230. Index selector 230 may in turn be coupled to sine cosine array 210 and may generate two (2) separate SCT addresses that may be used to read out the appropriate sine and cosine entries from sine cosine array 210. Sine cosine array 210 may further be coupled to a sign adjuster 240, where sign adjuster 240 may receive the sine and cosine entries that may be read out from sine cosine array 210 using the two generated SCT addresses. Sign adjuster 240 may also be coupled to a quadrant extractor 250, which may be coupled to SCCR 220 to receive the phase 222 and scale 226 values and output a quadrant value to sign adjuster 240. An adder 260 may be coupled to SCCR 220 to receive the phase 222 and stride 224 values and adder 260 may output a new phase value back to the SCCR 220.

In FIG. 2, in accordance with embodiments of the present invention, although only a single SCCR 220 is illustrated, SCCR 220 may be implemented using multiple SCCRs 220 arranged, generally, in parallel.

Figure 3:
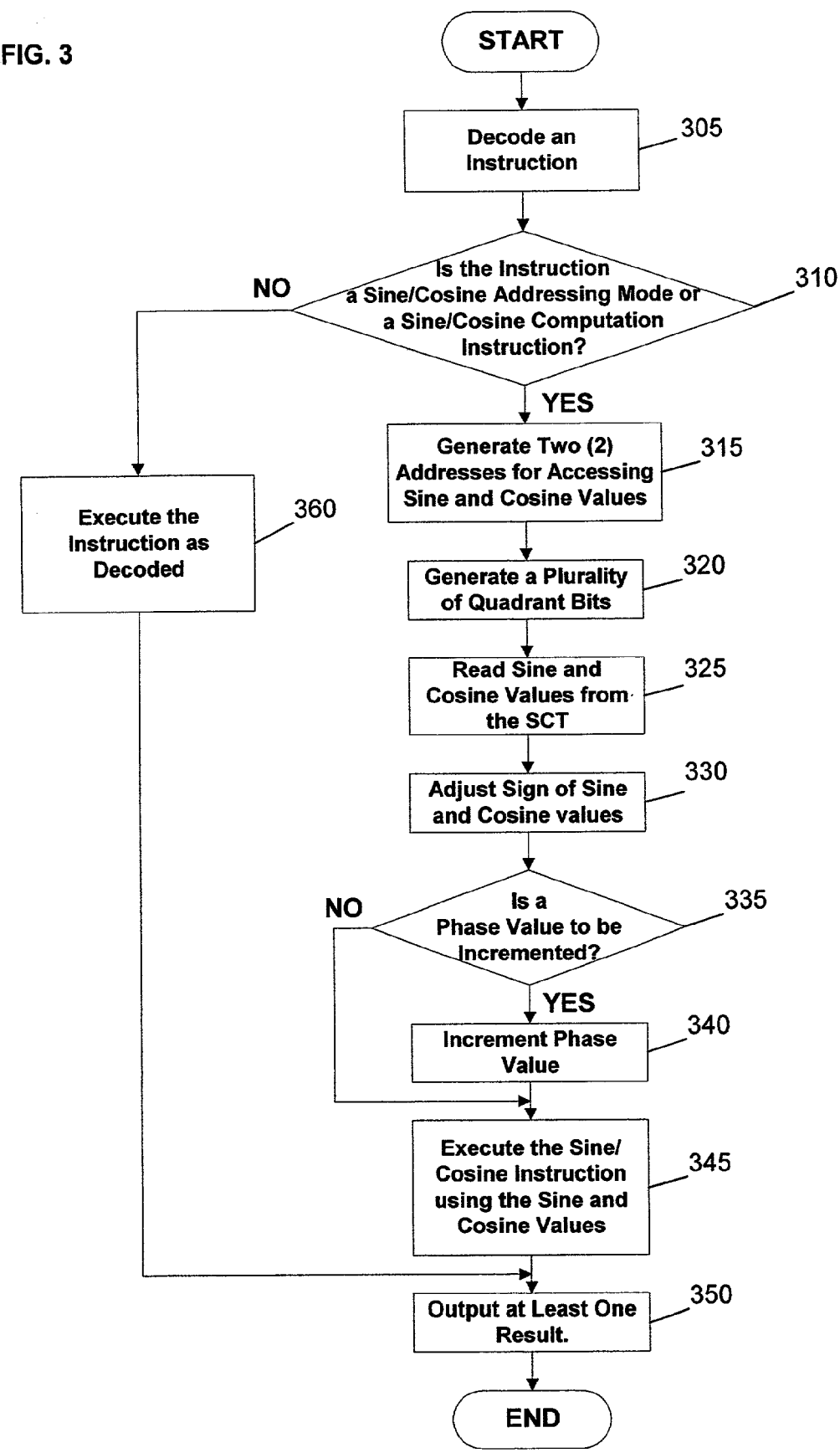
FIG. 3 is a top-level flow diagram of a method for providing sine and cosine value pairs to instruction in a processor, in accordance with an embodiment of the present invention.

FIG. 3 is a top-level flow diagram of a method for providing sine and cosine value pairs for instruction processing in a processor, in accordance with an embodiment of the present invention. In FIG. 3, an instruction may be decoded 305. Whether the instruction is a sine and cosine addressing mode instruction or a sine and cosine computation instruction may be determined 310. If the instruction is either of the sine and cosine addressing mode instruction or the sine and cosine computation instruction, then two SCT addresses may be generated 315 in index selector 230 of FIG. 2 to access the sine and cosine value pair requested in the instruction. In FIG. 3, a plurality of quadrant bits may be generated 320 and the sine and cosine values may be read 325 from SCT 210 of FIG. 2. In FIG. 3, the sign (that is, polarity) of the sine and cosine values may each be adjusted 330 in quadrant extractor 250 of FIG. 2 using the quadrant bits. For example, if the sine value is for an angle of between 180 and 360 degrees the sine value may be set equal to −sine, and if the cosine value is for an angle of between 90 and 270 degrees the cosine value may be set equal to −cosine.

In FIG. 3, whether the phase value in the SCCR is to be incremented may be determined 335. If the phase value is determined 335 to need to be incremented, the phase value may be incremented 340 in adder 260 of FIG. 2 by adding the stride value to the phase value. In FIG. 3, the instruction using the sine and cosine value pair may execute 345, at least one result from the executing sine and cosine instruction may be output 350 and the method may terminate.

In FIG. 3, if the instruction is determined 310 not to be either of the sine and cosine addressing mode instruction or the sine and cosine computation instruction, the instruction may be executed 360 as decoded, that is, without the provision of the sine and cosine value pair. At least one result from executing the instruction may be output 350 and the method may terminate.

In accordance with an embodiment of the present invention, a sine and cosine addressing mode may be implemented to provide sine and cosine value pairs to instructions. For example, the sine and cosine addressing mode may provide the sine and cosine value pairs from the SCT using the SCCR and optionally update the phase value in the SCCR. Specifically, the syntax of the sine and cosine addressing mode may be illustrated by the following example, showing a move (MOV) instruction moving a sine/cosine pair to a destination register, destR:

destR=SCCRi,
destR=SCCRi++, where i≧0 and indicates which of the SCCR registers may be used to provide the sine and cosine value pair, and "++" indicates that the SCCR needs to be incremented after the sine and cosine value pair is provided. However, although the sine and cosine addressing mode may be implemented in any type of instruction, the addressing mode may be limited to only those types of instructions that would use the sine and cosine value pairs, for example, multiply and move instructions.

In accordance with an embodiment of the present invention, the sine and cosine addressing mode described below may be implemented using a dedicated memory array, for example, a read-only array, and, generally, may be completely executed over one (1) processor clock cycle. However, it should be clearly understood that the sine and cosine addressing mode functionality may also be implemented to be executed over two (2) or more clock cycles.

In accordance with an embodiment of the present invention, the functionality of the sine and cosine addressing mode in an instruction may be defined by the following C-style pseudo-code example:

Generate the index to the table
      index=SCCRi.phase[SCCRi.scale+M−1, SCCRi.scale]
   Generate the quadrant bits
      quadrant=SCCRi.phase[SCCRi.scale+M+1, SCCRi.scale+M]
   Read sine and cosine values from the table (in the same cycle when memory is accessed)
      sine=SCT[index]
      cosine=SCT[$2^M$−1−index]
   Adjust sign for the correct quadrant
      if quadrant=01 or 10
         {sine=−sine}
      if quadrant=10 or 11
         {cosine=−cosine}
   Increment the phase, if needed
      if++
         {SCCRi.phase+=SCCRi.stride}
   In the execute stage, perform the operation specified in the instruction using the sine and cosine value pair, for example, the above specified MOV instruction
      destR=(cosine, sine)

Figure 4:
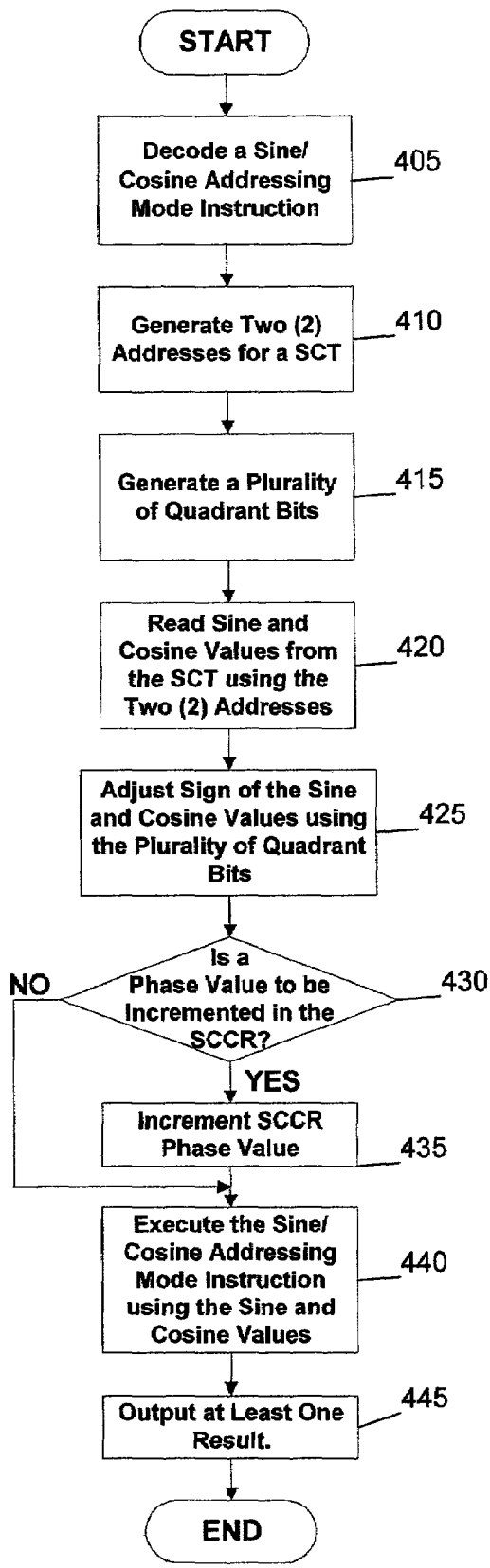
FIG. 4 is a detailed flow diagram of a method for providing sine and cosine addressing mode instructions in a processor, in accordance with an embodiment of the present invention.

FIG. 4 is a detailed flow diagram of a method for providing sine and cosine addressing mode instructions in a processor, in accordance with an embodiment of the present invention. In FIG. 4, an instruction may be decoded 405. Two (2) addresses for SCT 210 of FIG. 2 may be generated 410 using, for example, M-bits from SCCR 220. In FIG. 4, a plurality of quadrant bits may be generated 415 using, for example, two (2) bits from SCCR 20 of FIG. 2. In FIG. 4, the sine and cosine values may be read 420 from SCT 210 of FIG. 2 using, for example, the two (2) generated addresses. In FIG. 4, the sign of the sine and cosine values may be adjusted 425 in quadrant extractor 250 of FIG. 2 using, for example, the quadrant bits. In FIG. 4, whether the phase value in SCCR 220 of FIG. 2 is to be incremented may be determined 430. In FIG. 4, if the phase value is determined 430 to need to be incremented, the phase value may be incremented 435 in adder 260 of FIG. 2 by, for example, adding the stride value into the phase value. In FIG. 4, regardless of whether the phase value is determined to need incrementing, the sine and cosine addressing instruction may execute 440 using the provided sine and cosine value pair. A result of the execution 440 may be output 445 and the method may terminate.

In accordance with an embodiment of the present invention, a sine and cosine computation instruction may be implemented to provide sine and cosine value pairs. For example, the sine and cosine computation instruction may provide the sine and cosine value pairs from the SCT using the SCCR and optionally update the phase value in the SCCR. Specifically, the syntax of the sine and cosine computation instruction instruction may be represented by:

destR1=sinecosine R0[SCCRi] [INC], where the square brackets ([ ]) denote the optional instruction parameters that may not be required for execution of the instruction; [SCCRi], i≧1, indicates which of the SCCR registers may be used to provide the sine and cosine value pair, the default being SCCR0, and [INC] indicates that the SCCR that is used may be incremented after the sine and cosine value pair is provided.

In accordance with an embodiment of the present invention, the sine and cosine computation instruction described below, generally, may be completely executed over one (1) processor clock cycle. However, it should be clearly understood that the instructions also may be implemented to be executed over two (2) or more clock cycles.

In accordance with an embodiment of the present invention, the functionality of the sine and cosine computation instruction may be defined by the following C-style pseudo-code example:

Generate the index to the table
      index=SCCRi.phase[SCCRi.scale+M−1, SCCRi.scale]
   Generate the quadrant bits
      quadrant=SCCRi.phase[SCCRi:scale+M+1, SCCRi.scale+M]
   Read sine and cosine values from the table (in the same cycle when memory is accessed)
      sine=SCT[index]
      cosine=SCT[$2^M$−1−index]
   Adjust sign for the correct quadrant
      if quadrant=01 or 10
         {sine=−sine}
      if quadrant=10 or 11
         {cosine=−cosine}
   Execute
      DestR1=(cosine, sine)
   Increment the phase, if needed
      if INC
         {SCCRi.phase+=SCCRi.stride}

Figure 5:
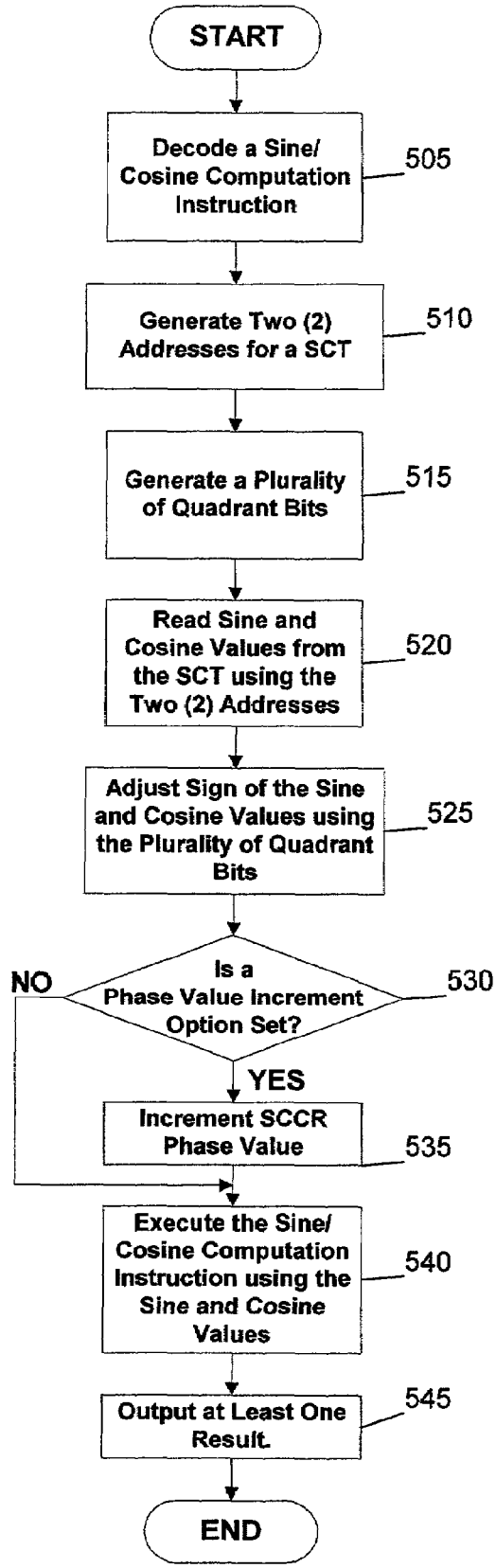
FIG. 5 is a detailed flow diagram of a method for providing sine and cosine computation instructions in a processor, in accordance with an embodiment of the present invention.

FIG. 5 is a detailed flow diagram of a method for providing sine and cosine computation instructions in a processor, in accordance with an embodiment of the present invention. In FIG. 5, an instruction may be decoded 505 as a sine and cosine computation instruction. Two (2) addresses for SCT 210 of FIG. 2 may be generated 510 using, for example, M-bits from SCCR 220. In FIG. 5, a plurality of quadrant bits may be generated 515 using, for example, two (2) bits from SCCR 220 of FIG. 2. In FIG. 5, the sine and cosine values may be read 520 from SCT 210 of FIG. 2 using, for example, the two (2) generated addresses. In FIG. 5, the sign of the sine and cosine values may be adjusted 525 in sign adjuster 240 of FIG. 2 using, for example, the two (2) quadrant bits. In FIG. 5, whether the phase value in SCCR 220 of FIG. 2 is to be incremented may be determined 530. In FIG. 5, if the phase value is determined 530 to need incrementing, the phase value may be incremented 535 in adder 260 of FIG. 2 by, for example, adding the stride value into the phase value. In FIG. 5, regardless of whether the phase value is determined to need incrementing, the sine and cosine computation instruction may execute 540 using the provided sine and cosine value pair. A result of the execution 540 may be output 545 and the method may terminate.

In accordance with an embodiment of the present invention, a method for providing sine and cosine value pairs for instruction processing in a processor includes decoding a sine and cosine instruction having a predetermined source angle and generating two addresses for a sine cosine table (SCT). The method also includes generating a plurality of quadrant bits, reading a sine and a cosine value pair from the SCT using the index value, and adjusting a sign of each value of the sine and the cosine value pair using the plurality of quadrant bits, if necessary. The method further includes incrementing a phase value, if the phase value is to be incremented. The method also includes executing the sine and cosine instruction using the sine and cosine value pair, and outputting at least one result.

In accordance with an embodiment of the present invention, a machine-readable medium having stored thereon one or more instructions adapted to be executed by a processor, the instructions which, when executed, configure the processor to decode a sine and cosine instruction having a predetermined source angle and generate two addresses to access a sine cosine table (SCT). The processor also is configured to generate a plurality of quadrant bits; read a sine and a cosine value pair from the SCT using these two addresses; and adjust a sign of each value of the sine and the cosine value pair using the plurality of quadrant bits, if necessary. The processor further is configured to increment a phase value, if the phase value is to be incremented; execute the sine and cosine instruction using the sine; and cosine value pair; and output at least one result.

In accordance with an embodiment of the present invention, a processor includes a decoder to decode instructions and a circuit coupled to the decoder. The circuit, in response to a decoded sine and cosine instruction, to generate two addresses to access a sine cosine table (SCT). The circuit further to generate a plurality of quadrant bits; read a sine and a cosine value pair from the SCT using the two addresses; and adjust a sign of each value of the sine and the cosine value pair using the plurality of quadrant bits, if necessary. The circuit to increment a phase value, if the phase value is to be incremented; execute the sine and cosine instruction using the sine and cosine value pair; and output at least one result.

In accordance with another embodiment of the present invention, a processor includes a decoder to decode an instruction as a sine and cosine instruction; and a circuit coupled to the decoder. The circuit includes a sine cosine table (SCT) and an index selector coupled to the SCT, where the index selector is to generate the two addresses. The circuit also includes a sine cosine control register (SCCR) coupled to the index selector, where the SCCR has a phase field, a stride field and a scale field. The circuit further includes a quadrant extractor coupled to the SCCR, the quadrant extractor to generate the plurality of quadrant bits and a sign adjuster coupled to the SCT and said quadrant extractor. The sign adjuster to adjust the sign of each value of the sine and the cosine value pair; and an adder coupled to the SCCR, the adder to increment the phase field.

In accordance with an embodiment of the present invention, a computer system including a processor; and a machine-readable medium coupled to the processor in which is stored one or more instructions adapted to be executed by the processor. The instructions which, when executed, configure the processor to decode an instruction as a sine and cosine instruction and generate two addresses to access a sine cosine table (SCT). The processor further in response to the decoded instruction to generate a plurality of quadrant bits, read a sine and a cosine value pair from the SCT using the two addresses, and adjust a sign of each value of the sine and the cosine value pair using the plurality of quadrant bits, if necessary. The processor to increment a phase value, if the phase value is to be incremented; execute the sine and cosine instruction using the sine and cosine value pair; and output at least one result.

While the embodiments described above relate mainly to 16-bit data they are not intended to limit the scope or coverage of the present invention. In fact, the method and/or system described above can be implemented with different sized data types such as, for example, 8-bit, 16-bit, 32-bit, 64-bit and/or larger data.

It should, of course, be understood that while the present invention has been described mainly in terms of microprocessor-based and multiple microprocessor-based personal computer systems, those skilled in the art will recognize that the principles of the invention, as discussed herein, may be used advantageously with alternative embodiments involving other integrated processor chips and computer systems. Accordingly, all such implementations which fall within the spirit and scope of the appended claims will be embraced by the principles of the present invention.

What is claimed is:

1. A method comprising:
   decoding a sine and cosine instruction;
   generating two addresses to access a sine cosine table (SCT);
   generating a plurality of quadrant bits;
   reading a sine and cosine value pair from the SCT using said two addresses;
   adjusting a sign of each value of said sine and cosine value pair using said plurality of quadrant bits, if necessary;
   incrementing a phase value, if said phase value is to be incremented;
   executing said sine and cosine instruction using said sine and cosine value pair; and
   outputting at least one result.

2. The method as defined in claim 1 wherein said decoding operation comprises:
   decoding a sine and cosine addressing mode instruction, said sine and cosine addressing mode instruction including a sine cosine control register (SCCR) operand.

3. The method defined in claim 2 wherein said generating said two addresses operation comprises:
   storing a predetermined number of bits, M, from said SCCR as a index value.

4. The method as defined in claim 3 wherein said predetermined number of bits, M, is used to define a size of said SCT, said size of said SCT is equal to $2^M$.

5. The method as defined in claim 3 wherein said predetermined number of bits, M, is used to define a maximum number of entries in said SCT, said maximum number of entries in said SCT is equal to $2^M$.

6. The method as defined in claim 2 wherein said generating said plurality of quadrant bits operation comprises:
   storing a predetermined number of bits from said SCCR as said quadrant value.

7. The method as defined in claim 6 wherein said storing operation comprises:
   storing two bits from said SCCR as said quadrant value.

8. The method as defined in claim 2 wherein said reading operation comprises:
   reading a sine value from said SCT using a first address of said two addresses;
   storing said sine value;
   reading a cosine value from said SCT using a second address of said two addresses; and
   storing a cosine value.

9. The method as defined in claim 8 wherein said reading operation comprises:
   reading said sine value from said SCT using said first address, said first address is the SCT entry specified by offsetting the SCT base address by a index value; and
   storing said read sine value in a temporary sine memory location.

10. The method as defined in claim 8 wherein said reading operation further comprises:
    reading said cosine value from said SCT using said second address, said second address is the SCT entry specified by offsetting the SCT base address by $(2^M-1)$ minus a index value; and
    storing said read cosine value in a temporary cosine memory location.

11. The method as defined in claim 8 wherein said adjusting said sine value operation comprises:

setting said sine value equal to —sine, if a quadrant value indicates said predetermined source angle is between 180 degrees and 360 degrees.

12. The method as defined in claim 8 wherein said adjusting said cosine value operation comprises:
setting said cosine value equal to —cosine, if a quadrant value indicates said predetermined source angle is between 90 degrees and 270 degrees.

13. The method as defined in claim 8 wherein said incrementing said SCCR operation comprises;
incrementing a phase value in said SCCR by a stride value specified in said SCCR.

14. The method as defined in claim 1 wherein said decoding operation comprises:
decoding a sine and cosine computation instruction, said sine and cosine computation instruction including a destination register and a source register.

15. The method as defined in claim 14 wherein said generating said two addresses operation comprises:
storing a predetermined number of bits, M, from said SCCR as a index value.

16. The method as defined in claim 15 wherein said predetermined number of bits, M, is used to define a size of said SCT, said size of said SCT is equal to $2^M$.

17. The method as defined in claim 14 wherein said generating said plurality of quadrant bits operation comprises:
storing two bits from said SCCR as said quadrant value.

18. The method as defined in claim 14 wherein said reading operation comprises:
reading said sine value from said SCT using a first address of said two addresses;
storing said sine value;
reading said cosine value from said SCT using a second address of said two addresses; and
storing a cosine value.

19. The method as defined in claim 14 wherein said incrementing said SCCR operation comprises:
determining an increment variable is set; and
incrementing a phase value in said SCCR by a stride value specified in said SCCR.

20. A machine-readable medium, said machine-readable medium having stored thereon one or more instructions adapted to be executed by a processor, the instructions which, when executed, configure the processor to:
decode a sine and cosine instruction having a predetermined source angle;
generate two addresses to access a sine cosine table (SCT);
generate a plurality of quadrant bits;
read a sine and cosine value pair from the SCT using said two addresses;
adjust a sign of each value of said sine and said cosine value pair using said plurality of quadrant bits, if necessary;
increment a phase value, if said phase value is to be incremented;
execute said sine and cosine instruction using said sine and cosine value pair; and
output at least one result.

21. The machine-readable medium as defined in claim 20 wherein said decode operation comprises one of:
decode said instruction as a sine and cosine addressing mode instruction; and
decode said instruction as a sine and cosine computation instruction.

22. The machine-readable medium as defined in claim 20 wherein said generate said two addresses operation comprises:
store a predetermined number of bits, M, from a SCCR as an index value, said predetermined number of bits is used to define a size of said SCT to be equal to $2^M$;
outputting a first address defined by offsetting a set base address by said index value; and
outputting a first address defined by offsetting a set base address by $(2^M-1)$ minus said index value.

23. The machine-readable medium as defined in claim 20 wherein said read operation comprises:
read said sine value from said SCT using a first of said two addresses;
store said sine value;
read said cosine value from said SCT using a second of said two addresses; and
store said cosine value.

24. The machine-readable medium as defined in claim 20 wherein said adjust said sign of each value operation comprises at least one of:
set said sine value equal to its negative value, if said quadrant value indicates said predetermined source angle is between 180 degrees and 360 degrees; and
set said cosine value equal to its negative value, if said quadrant value indicates said predetermined source angle is between 90 degrees and 270 degrees.

25. A processor comprising:
a decoder to decode an instruction as a sine and cosine instruction; and
a circuit coupled to said decoder, said circuit in response to said decoded instruction to,
generate two addresses to access a sine cosine table (SCT);
generate a plurality of quadrant bits;
read a sine and cosine value pair from the SCT using said two addresses;
adjust a sign of each value of said sine and said cosine value pair using said plurality of quadrant bits, if necessary;
increment a phase value, if said phase value is to be incremented;
execute said sine and cosine instruction using said sine and cosine value pair; and
output at least one result.

26. The processor defined in claim 25 wherein said circuit comprises:
a sine cosine table (SCT);
an index selector coupled to said SCT, said index selector to generate said two addresses;
a sine cosine control register (SCCR) coupled to said index selector, said SCCR includes a phase field, a stride field and a scale field;
a quadrant extractor coupled to said SCCR, said quadrant extractor to generate said plurality of quadrant bits;
a sign adjuster coupled to said SCT and said quadrant extractor, said sign adjuster to adjust said sign of each value of said sine and said cosine value pair; and
an adder coupled to said SCCR, said adder to increment said phase field.

27. The processor as defined in claim 25 wherein said SCT includes $2^M$ entries, where M equals a bit length for an index value used to access said SCT.

28. A lookup table comprising:
a sine cosine table (SCT);
an index selector coupled to said SCT, said index selector to generate two addresses to read a sine and cosine value pair from said SCT;
a sine cosine control register (SCCR) coupled to said index selector, said SCCR to receive and provide information to said index selector to generate said two addresses and to receive and provide sign adjustment information and an increment value;
a quadrant extractor coupled to said SCCR, said quadrant extractor to generate a plurality of quadrant bits using said sign adjustment information;
a sign adjuster coupled to said SCT and said quadrant extractor, said sign adjuster to adjust a sign of each value of said sine and cosine value pair using said plurality of quadrant bits and output said adjusted sine and cosine value pair; and
an adder coupled to said SCCR, said adder to increment said phase field using said increment value.

29. The lookup table as defined in claim 28 wherein said SCT comprises:
an array having a plurality of rows, each of said plurality of rows including a sine value for an angle of between 0 degrees and 90 degrees.

30. The lookup table as defined in claim 29 wherein said SCT comprises:
$2^M$ rows, where M equals the number of bits of said index information provided by said SCCR.

* * * * *